US008994548B2

(12) United States Patent
Gaboury et al.

(10) Patent No.: US 8,994,548 B2
(45) Date of Patent: Mar. 31, 2015

(54) AUTOMOBILE LOCATION DETECTOR

(71) Applicant: Ford Global Technologies, LLC, Dearborn, MI (US)

(72) Inventors: Scott Howard Gaboury, Ann Arbor, MI (US); John Robert Van Wiemeersch, Novi, MI (US); Lisa Therese Boran, Northville, MI (US); Mark George Vojtisek, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 13/912,360

(22) Filed: Jun. 7, 2013

(65) Prior Publication Data

US 2014/0361904 A1 Dec. 11, 2014

(51) Int. Cl.

| | |
|---|---|
| ***B60Q 1/48*** | (2006.01) |
| ***B60Q 1/26*** | (2006.01) |
| ***B60R 25/10*** | (2013.01) |
| ***G08B 3/10*** | (2006.01) |

(52) U.S. Cl.

CPC .................................... *G08B 3/10* (2013.01)

USPC ................. 340/692; 340/539.11; 340/539.13; 340/539.21; 340/539.23; 340/539.32; 340/425.5; 340/539.2; 340/8.1; 340/12.5; 701/2; 701/468; 701/526; 701/538

(58) Field of Classification Search

None

See application file for complete search history.

(56) References Cited

U.S. PATENT DOCUMENTS

| | | | | | |
|---|---|---|---|---|---|
| 4,797,671 | A | * | 1/1989 | Toal, Jr. | 340/8.1 |
| 4,891,650 | A | | 1/1990 | Sheffer | |
| 4,896,370 | A | * | 1/1990 | Kasparian et al. | 455/77 |
| 4,905,559 | A | * | 3/1990 | Viviani | 340/5.27 |
| 5,889,509 | A | * | 3/1999 | Sudo | 345/168 |
| 6,501,967 | B1 | * | 12/2002 | Makela et al. | 455/567 |
| 6,838,987 | B1 | | 1/2005 | Quinonez | |
| 6,909,964 | B2 | | 6/2005 | Armstrong et al. | |
| 7,369,061 | B1 | * | 5/2008 | Sellers et al. | 340/932.2 |
| 8,004,400 | B2 | * | 8/2011 | Tieman et al. | 340/539.13 |
| 8,223,073 | B2 | | 7/2012 | Berntsen et al. | |
| 2005/0163477 | A1 | * | 7/2005 | Kendall | 386/68 |
| 2008/0231433 | A1 | * | 9/2008 | McBride et al. | 340/426.17 |
| 2009/0085770 | A1 | * | 4/2009 | Mergen | 340/904 |
| 2009/0174548 | A1 | * | 7/2009 | Chan et al. | 340/539.13 |
| 2010/0073201 | A1 | * | 3/2010 | Holcomb et al. | 340/990 |
| 2011/0010269 | A1 | * | 1/2011 | Ballard | 705/26.41 |
| 2012/0077475 | A1 | * | 3/2012 | Holcomb et al. | 455/414.1 |
| 2012/0235835 | A1 | * | 9/2012 | Jahn | 340/989 |
| 2012/0258741 | A1 | * | 10/2012 | Tillson et al. | 455/457 |
| 2013/0101140 | A1 | * | 4/2013 | Cho et al. | 381/109 |
| 2013/0214916 | A1 | * | 8/2013 | Garios | 340/425.5 |

FOREIGN PATENT DOCUMENTS

JP 2013197659 A * 9/2013

* cited by examiner

*Primary Examiner* — Julie Lieu

(74) *Attorney, Agent, or Firm* — Frank A. MacKenzie; Brooks Kushman P.C.

(57) ABSTRACT

A system includes a receiver configured to receive a signal representing a sequence of user inputs to a portable electronic device and an audible device configured to generate a sound based at least in part on the sequence of user inputs. A duration and volume of the sound is based at least in part on the sequence of user inputs received within a predetermined time interval. A method includes receiving the signal provided to the portable electronic device within a predetermined time interval and generating the sound based at least in part on the sequence of user inputs.

20 Claims, 3 Drawing Sheets

AUTOMOBILE LOCATION DETECTOR

BACKGROUND

Owners of automobiles frequently have difficulty locating their vehicles when parked in a parking lot, parking garage, or on the street. At times, this can be the result of the driver forgetting where they parked or a larger vehicle blocking the view of their vehicle. The problem can further be compounded when the parking area or street is crowded by other vehicles, particularly when the other vehicles may be of similar make, model, and/or color as the vehicle the owner is trying to locate. Historically, when attempting to locate a vehicle in a crowded parking lot, the vehicle owner has traditionally relied on either pressing a panic button or double-pressing a lock button on a portable remote to activate either the vehicle alarm system or a soft chirp respectively. The vehicle owner may then listen for the audible response produced by the vehicle to locate the vehicle. Neither the panic nor the lock button, however, were designed or intended for such use. The panic button was designed to be intentionally loud and harsh to draw attention and alert others to the vehicle. Using the panic button in this fashion makes the alarm system less effective due to the high usage and annoyance factor of the alarm triggering. The chirp from pressing the lock button was designed to be soft and pleasing to the listener to confirm that the vehicle is locked, and thus, may not be loud enough to be heard from a distance.

SUMMARY

A system includes a receiver configured to receive a signal representing a sequence of user inputs to a portable electronic device and an audible device configured to generate a sound based at least in part on the sequence of user inputs. A duration and volume of the sound is based at least in part on the sequence of user inputs received within a predetermined time interval.

A method includes receiving the signal provided to the portable electronic device within a predetermined time interval and generating the sound based at least in part on the sequence of user inputs. The duration and volume of the sound is based at least in part on the sequence of user inputs received within the predetermined time interval.

A vehicle includes a receiver that receives the signal representing the sequence of user inputs provided to a portable electronic device and an audible device configured to generate a sound based at least in part on the sequence of user inputs. The duration and volume of the sound is based at least in part on the sequence of user inputs received within a predetermined time interval. The vehicle further includes a control unit that receives the signal and generates a control signal in accordance with the sequence of user inputs provided to the portable electronic device. The audible device is configured to generate the sound based on the control signal.

DETAILED DESCRIPTION

Parking garages are just one of many areas where an individual may become separated from their vehicle and forget where it is parked and/or located. One way an individual may attempt to find their vehicle is by carrying a small portable electronic device capable of communicating with the vehicle, and instructing the vehicle to produce an audible or visual signal to aid the individual in locating the vehicle.

Figure 1:
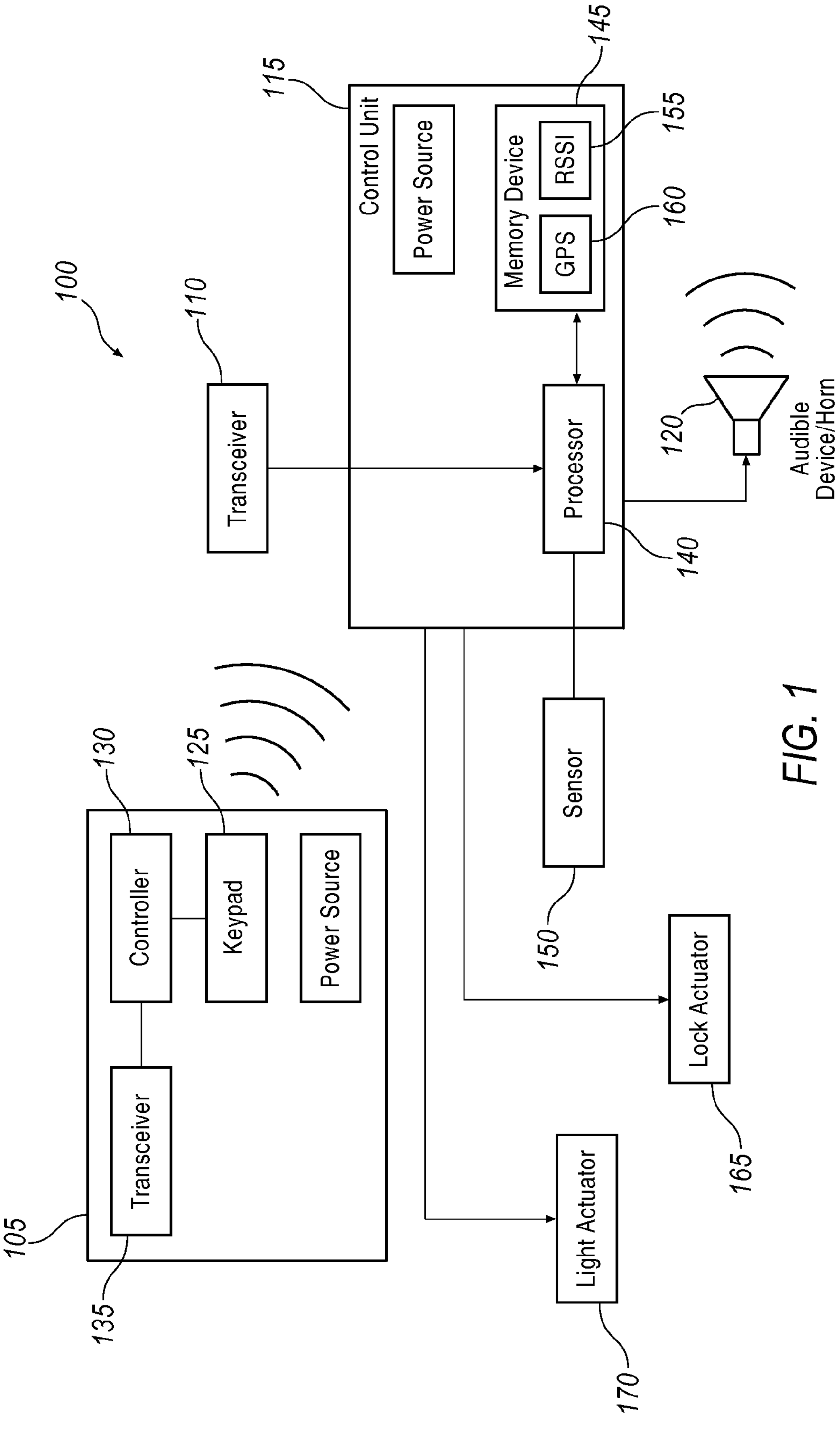
FIG. 1 illustrates an exemplary audible vehicle locator system including a portable electronic device and a control unit.

FIG. 1 illustrates an exemplary vehicle locator system 100 configured to receive a signal based on a user input and produce a sound using an audible device 120 to aid the user in finding a vehicle. In FIG. 1, a vehicle locator system 100 having a portable electronic device 105, a control transceiver 110, a control unit 115, and an audible device 120, communicates a signal from the portable electronic device 105 to the control unit 115. The signal may be indicative of the volume and duration of the sound to be produced by the audible device 120. The control unit 115 may include a processor 140 and a memory device 145, and may be in communication with a number of peripheral devices, such as an audible device 120, a sensor 150, a lock actuator 165, or a light actuator 170. The system may take many different forms and include multiple and/or alternate components and facilities. The exemplary components illustrated in the Figures are not intended to be limiting. Indeed, additional or alternative components and/or implementations may be used.

The vehicle locator system 100 may be included in any type of passenger or commercial vehicle, such as a car, truck, sport utility vehicle, cross-over vehicle, van, minivan, tractor-trailer, or the like. Other types of vehicles may include a motorcycle, boat, airplane, or train.

The portable electronic device 105 may include a keypad 125, a controller 130, and a transceiver 135. An exemplary portable electronic device 105 may be a remote keyless entry fob, a remote transmitter, cell phone, or other mobile device capable of transmitting data across a radio frequency, such as an ultra-high frequency (UHF). The portable electronic device 105 may include various input and output devices, as discussed in greater detail below. One example output device may include a light output, such as a light emitting diode (LED) configured to provide a visual confirmation to the user that an input provided to, e.g., the keypad 125 was received.

The keypad 125 may include multiple buttons and be configured to allow a user to input a sequence into the controller 130 (discussed below). The buttons may be provided via conventional physical switches, capacitive sensors, biometric sensors, or other sensing technologies. The buttons may be labeled with alphanumeric characters for inputting a PIN or password, or may be labeled by a picture identifying a function, such as locking or unlocking a vehicle. For example, the keypad may include lock, unlock, and panic buttons (see FIG. 3). A user may press, e.g., the lock button, or any other button on the keypad 125, a number of times within in a predetermined time frame, and the number of times the button on the keypad 125 is pressed may represent the volume and duration of the sound to be produced by the audible device 120 (discussed in greater detail below). In one exemplary configuration, each subsequent press of the button on the keypad 125 increases the volume and duration of the sound produced by the audible device 120. For example, after a user presses the button three times, each subsequent press within 5 seconds of the previous press may instruct the control unit 115 to have the audible device 120 increase the volume of the sound produced or the duration of the sound produced. The volume or duration may continue to increase for each subsequent press within, e.g., 5 seconds of the previous press. In addition, the keypad 125 may be used to control the duration and/or brightness of the vehicle lights.

The controller 130 may be configured to receive the sequence of inputs from the keypad 125 as entered by the user, and to encode the sequence as a signal including a command to be communicated to the control unit 115 via the transceiver 135. For instance, the controller 130 may receive an input from the keypad 125 representative of the number of times a user has pressed, e.g., the lock button, and may generate a signal, based representative of the volume and duration of the sound to be produced by the audible device 120 based on the number of times the user pressed the lock button. As an example, the user may press the lock button two times within five seconds to lock the car and for the audible device 120 to produce a sound at a predefined level 1, signaling the vehicle is locked. If the user were to press the lock button a third time within five seconds of the second press, the controller 130 may be configured to generate the signal to command the audible device 120 to produce a sound at a predefined level 2, which commands the sound to have a greater volume, duration, or both, relative to the sound generated at predefined level 1. If the user were to subsequently press the lock button a fourth time within five seconds of the third press, the controller 130 may be configured to generate the signal to command the audible device 120 to produce a sound at a volume and duration associated with a predefined level 3. At the predefined level 3, the volume and duration may be greater than at predefined levels 1 and 2. This process may continue, increasing the level of the sound produced by the audible device 120 with each subsequent press of the lock button by the user. The control unit 115 may be programmed with as many predefined sound levels as needed, and may be programmed to increase in any increment of volume and duration as needed, and to step-up the level in time windows greater or less than 5 seconds between pushes.

Furthermore, the controller 130 may be configured to store the sequence for a predetermined amount of time, and upon the user subsequently pressing a button on the keypad 125 within the predetermined amount of time, the controller 130 may be configured to resend the signal to the control unit 115. For example, the controller 130 may receive an input from the keypad 125 that the user has pressed, e.g., the lock button three times. The controller 130 may encode the sequence of three presses of the lock button as a signal to be communicated to the control unit 115, as well as store the signal for a period of time, such as 30 seconds, whereas if the user presses the lock button again after 5 second of the prior press but before 30 seconds has elapsed, the controller 130 will resend the signal to the control unit 115. The signal generated by the controller 130 may also include an instruction for the control unit 115 to transmit a command to a lock actuator 165 configured to lock and/or unlock a vehicle door and/or a light actuator 170 configured to turn at least a subset of interior or exterior lights of the vehicle on or off.

The transceiver 135 may be configured to communicate with the control unit 115 via the control transceiver 110. The transceiver 135 may be configured to communicate the signal from the portable electronic device 105 to the control unit 115 and vice versa. For example, the transceiver 135 may communicate a signal, generated by the controller 130, including a command representing the volume of the sound to be produced by the audible device 120. As another example, the transceiver 135 may be configured to receive the GPS location of the vehicle from the GPS module 160 of the control unit 115 upon the user pressing the lock button on the portable electronic device 105.

The control transceiver 110 may be configured to communicate with the transceiver 135 of the portable electronic device 105. As an example, the control transceiver 110 may be configured to receive a signal, including a command representing the volume of the sound to be generated by the audible device 120, from the portable electronic device 105. The control transceiver 110 may be further configured to communicate the signal received from the portable electronic device 105 across a network, such as a controller area network (CAN), to the control unit 115. The control transceiver may also be configured to receive the location of the control unit 115 from the processor 140 executing a global positioning system (GPS) module 160 (discussed in greater detail below), and transmit the GPS location of the control unit 115 to the portable electronic device 105. The location of control unit 115 may also be established or supplemented by other means and methods such as cellular tower triangulation by a vehicle modem, dead reckoning via the vehicle dynamics module, triangulation off TV towers, WiFi Hot spots, camera recognition, and other means of establishing a location electronically.

The control unit 115 may include a processor 140 and a memory device 145. The control unit 115 may also be in communication with peripheral devices such as an audible device 120 or a sensor 150. The processor 140, embodied in the control unit 115, may be configured to receive various inputs and generate outputs based on the inputs received or computer executable instructions stored in a memory device 145. One possible output may include a control signal, such as a pulse-width modulation signal, that can be used to control the operation of the audible device 120. The processor 140 may be in communication with a memory device 145 configured to store computer-executable program code, such as the instructions of a received signal strength module 155 and a global positioning system (GPS) module 160.

The control unit 115, executing the instructions of the received signal strength module 155 on a processor 160, may be configured to determine approximately how far the portable electronic device 105 is from the control unit 115 based on the signal received. The received signal strength module 155 may be configured to determine the distance between the portable electronic device 105 and the control unit 115 by counting the number of redundant messages received by the control unit 115 from the portable electronic device 105. For example, the portable electronic device 105 may be configured to send out three redundant messages to the control unit 115 and the received signal strength module 155 may be configured to count those messages. If the received signal strength module 155 receives all three messages sent by the portable electronic device 105, the received signal strength module 155 may conclude that the portable electronic device 105 is near the control unit 115, and that no further action is required. But, if the received signal strength module 155 only receives one of the three messages from the portable electronic device 105, the received signal strength module 155 may conclude that the portable electronic device 105 is a greater distance away from the control unit 115 or that there is an object obstructing the signal, and instruct the processor 140 to alter the control signal for the audible device 120 accordingly, i.e., increase the volume of the sound produced above the volume that was requested by the portable electronic device 105.

Furthermore, the control unit 115, executing the instructions of the GPS module 160 on a processor 160, may be configured to determine approximately how far the portable electronic device 105 is from the control unit 115 based on the GPS location of the control unit 115 relative to the portable electronic device 105. The GPS module 160 may be configured to determine the distance between the portable electronic device 105 and the control unit 115 by storing the GPS location of the control unit 115 via the GPS module 160 when the user presses the lock button after exiting the vehicle. At some time later, when the user is attempting to locate their vehicle, the user may press the lock button a number of time signaling the vehicle to produce a sound. The portable electronic device 105 may determine the GPS location of the portable electronic device 105 by using its own portable GPS module 140 (if equipped) or by communicating with the user's smart phone or other portable device having GPS capability via, e.g., a Wi-Fi or Bluetooth® connection. The GPS location of the portable device may also be established by other means such as cellular tower triangulation, WiFi spot recognition, and other electronic means. The GPS location of the portable electronic device 105 may be included in the signal transmitted to the control unit 115, where the control unit 115 may then determine the distance between the vehicle and the portable electronic device 105. If the control unit 115 determines that the portable electronic device 105 is a great distance away from the vehicle, for example, over 50 yards away, the processor 140 may alter the control signal for the audible device 120 accordingly, i.e., increase the volume of the sound produced above the volume that was requested by the portable electronic device 105.

Another exemplary technique for determining the GPS location of the vehicle is through a user's mobile phone. The control unit 115 may be configured to communicate with the user's mobile phone via, e.g., a Wi-Fi or Bluetooth® connection. Under this configuration, when the user exits the vehicle and presses, e.g., the lock button on the portable electronic device 105, the control unit 115 may request the GPS location of the user's mobile phone over the Bluetooth® connection and store the location for later use. As described above, at some later time, when the user attempts to locate their vehicle, the portable electronic device 105 may request the current GPS location of the user's mobile phone and include the location in the signal transmitted to the control unit 115, so that the control unit 115 may be configured to alter the volume and duration of the sound produced by the audible device 120 is required. In another exemplary configuration for determining the GPS location of the control unit 115, the portable electronic device 105 may be the users mobile phone configured to automatically send the GPS location to the control unit 115 upon the user pressing the lock button. When the portable electronic device 105 is the user's mobile phone, the portable electronic device 105 may be configured to include the GPS location of the phone in the signal communicated to the control unit 120, and the control unit may go through the same process as described above in determining how far the portable electronic device 105 is from the control unit 120 and alter the control signal to the audible device 120 if required.

The audible device 120 may include any device capable of producing a sound, such as a horn or speaker or piezoelectric device. For example, the audible device 120 may be a car horn configured to receive a control signal from the control unit 115, the control signal may command the horn 120 to produce sound at a commanded volume and duration. Increasing the magnitude and/or duration of the control signal sent to the horn 120 may increase the loudness of the sound produced by horn 120. The volume of the sound produced may be a function of the time of day. For instance, the control unit 115 may command a louder sound from the audible device 120 during the daytime and a quieter sound at night. Further, the volume of the sound may be proportional to ambient noise. For instance, the vehicle may include a microphone configured to detect ambient noise, and the control unit 115 may command a louder sound from the audible device 120 when ambient noise is high (e.g., exceeds a predetermined level). Moreover, the sounds produced by the horn 120 may be customized to play representations of songs. In some exemplary approaches, the user may select the sound played by the audio device 120 in response to the signals received from the portable electronic device 105. The volume of the sound produced may be a function of vehicle battery voltage or the voltage of the control signal output by the processor 140 to the audible device 120.

The vehicle locator system 100 may also include sensor(s) 150 in communication with the control unit 115. The sensor(s) 150 may be configured to collect information regarding the surrounding environment of the vehicle, and to communicate the information to the control unit 115. The control unit 115 may be configured to analyze the information provided by the sensor 150 and alter the instruction communicated to the other peripheral devices, such as the audible device 120. For example, the sensor 150 may include a camera configured to observe the physical surroundings of the vehicle and communicate that information to the control unit 115 for processing. The control unit 115 may be configured to analyze the visual information provided by the camera to determine if there are any objects that may interfere with the sound produced by the audible device 120. For example, if the control unit 115 determines that the vehicle is parked near a sound absorbing medium, such as a shrub, based on the information received from the sensor 150, the control unit 115 may be configured to increase the magnitude and duration of the control signal sent to the audible device 120 above what was requested by the portable electronic device 105 in order to compensate for the dampening effect of the sound absorbing medium. Alternatively, if the control unit 115 determines that the vehicle is parked near a sound reflecting medium, such as a brick wall, based on the data from the sensor 150, the control unit 115 may be configured to decrease the magnitude and duration of the control signal sent to the audible device 120 below what was requested by the portable electronic device 105 in order to compensate for the reflective and/or magnifying effect of the sound reflecting medium.

Alternatively, the sensor 150 may include an antenna configured to detect the location of the portable electronic device 105 in relation to the vehicle. For example, there may be separate antennas, one located at the front of the vehicle and a second located at the rear of the vehicle. Upon the user pressing a button on the portable electronic device 105, such as the lock button, the antennas may send out a pulsating signal that is detected by the portable electronic device 105, and the portable electronic device 105 upon receiving the signal transmits a signal back to the antennas. The antennas may communicate to the control unit 115 when each antenna received the signal from the portable electronic device 105, and based on whichever signal was received first, the control unit 115 may be configured to determine direction from which the user departed the vehicle. For example, if the control unit 115 determines that the user departed moving away from the rear of the vehicle based on the information from the sensor 150, assuming the audible device 120 is directed toward the front of the vehicle, the control unit 115 may be configured to increase the magnitude and duration of the control signal sent to the audible device 120 above what was requested by the portable electronic device 105 in order to compensate for audible device 120 being oriented such that the signal will be loudest traveling in the direction opposite of that which the user departed from the vehicle. Alternatively, if the control unit 115 determines that the user departed moving away from the front of the vehicle based on the information from the sensor 150, the control unit 115 may be configured to decrease the magnitude and duration of the control signal sent to the audible device 120 below what was requested by the portable electronic device 105 to compensate for the audible device 120 being oriented in the same direction that the user departed from the vehicle.

Another possible sensor 150 may include a thermometer configured to determine the ambient temperature or the temperature of the audible device 120. Sound travels faster at higher ambient temperatures, resulting in a shorter pulse producing a sound at a similar decibel level as a longer pulse at a colder ambient temperature. Furthermore, a similar result will occur when the temperature of the audible device 120 is warmer. An audible device 120 with a warmer temperature will produce a sound at a higher decibel level than a colder audible device 120 despite both receiving a control signal of similar magnitude and duration.

The lock actuator 165 may be configured to lock and unlock the vehicle. For example, the lock actuator 165 may be configured to receive an in instruction from the control unit 115 to lock the vehicle when the user has pressed the lock button on the portable electronic device 105. As another example, the lock actuator 165 may be configured to receive an instruction from the control unit 115 to unlock the vehicle when the user has pressed the unlock button on the portable electronic device 105. Furthermore, the lock actuator 165 may be configured to unlock all of the doors, or only a single specific door of the vehicle based on the user selection at the portable electronic device 105. For example, if the user presses the unlock button on the portable electronic device 105 once, the lock actuator 165 may be configured to unlock only the driver's door, whereas if the user presses the unlock button twice within a predetermined time frame, the lock actuator 165 may be configured to unlock all of the vehicles doors.

The light actuator 170 may be configured to control the operation of the lights of the vehicle. For example, the light actuator 170 may be configured to receive an instruction from the control unit 115 to flash the light(s) of the vehicle when the user has pressed the lock button or the unlock button on the portable electronic device 105. In some instances, the light actuator 170 may be used to generate a visual signal of the location of the vehicle 100. The visual signal may be generated in addition to or instead of the audible signal discussed above. The light actuator 170 may be configured to control, e.g., the duration and/or brightness of the vehicle lights. The brightness of the lights may be related to ambient light levels. That is, the control unit 115 may cause the lights to be dimmer in low light conditions (e.g., at night) and brighter during instances of high amounts of ambient light (e.g., during daylight hours). The control unit 115 may determine the amount of ambient light using a clock and geographical coordinates of the vehicle or from a sensor (not shown).

Whether the vehicle responds with a visual signal, an audible signal, or both, may be determined from the signal sent from the portable electronic device 105. For instance, the portable electronic device 105 may be configured to receive an input from the user indicating the user's preference for the response from the vehicle. The portable electronic device 105 may allow the user to select a visual signal, in which case the vehicle will respond by manipulating vehicle lights, an audible signal, in which case the vehicle will respond through a sound produced by the audible device 120, or both, in which case the vehicle will respond by manipulating the vehicle lights and producing a sound.

Figure 2:
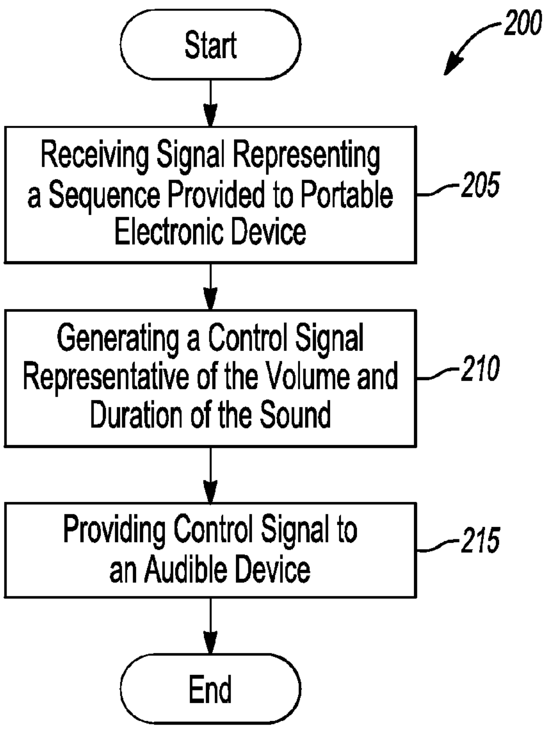
FIG. 2 illustrates a flowchart of an exemplary process that may be implemented by the vehicle locator system of FIG. 1.

FIG. 2 illustrates an exemplary process 200 of activating a vehicle locator system 100. The process 200 may be performed by one or more components of the vehicle or external components such as the control unit 115, the portable electronic device 105, and the audible device 120.

At block 205, the control unit 115 receives a signal. For example, the control transceiver 110 may be configured to receive a signal from a portable electronic device 105 and communicate the signal to the control unit 115. The signal may represent a sequence of user inputs provided to the keypad 125 of the portable electronic device 105 that represent the user's request for the audible device 120 to produce a sound for locating the vehicle.

At block 210, the control unit 115 generates the control signal representing a command for the audible device 120 to generate sound based on the signal received at block 205. For example, if the signal to the control unit 115 from the portable electronic device 105 represents an instruction for the audible device 120 to produce a sound at a predefined level, the control unit 115 will generate the control signal representative of the volume and duration of the sound to be produced by the audible device 120 to create the sound at the predefined level.

At block 215, the control unit 115 provides the control signal to the audible device 120. For example, the control unit 115 may be configured to provide the generated control signal to the audible device 120 facilitating the user's interaction with the audible device 120 as the user attempts to locate their vehicle.

Figure 3:
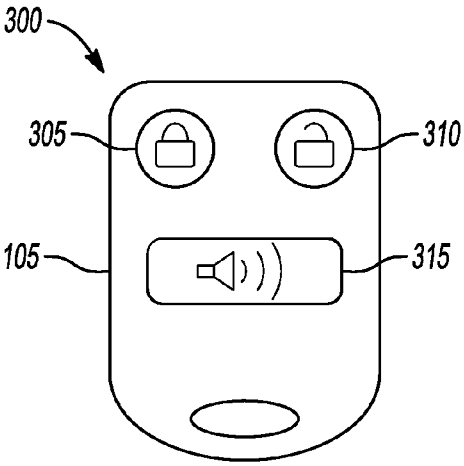
FIG. 3 illustrates a front view of an exemplary portable electronic device.

FIG. 3 illustrates an exemplary remote control or fob system 300. In FIG. 3, a remote system 300, including a portable electronic device 105 having a lock button 305, an unlock button 310, and a panic button 315 is shown.

The lock button 305 may be configured to lock the vehicle when pressed by a user. Furthermore, the lock button 305 may be configured to lock the vehicle, signal the audible device 120 to generate a sound, and flash the light(s) of the vehicle. For example, when the lock button 305 is pressed by a user, the control unit may send a command to the lock actuator 165 to lock all of the doors of the vehicle, as well as a command to the light actuator 170 to flash the lights and control signal to the audible device 120 to signal to the user that the vehicle is locked.

Alternatively, the unlock button 310 may be configured to unlock the vehicle when the button is pressed. The unlock button 310 may further be configured to unlock all of the vehicle doors, or only a specific door, such as the driver door. For example, if the user presses the unlock button 310 once, the control unit 115 may command the lock actuator 165 to only unlock the driver door of the vehicle. If the user presses the unlock button 310 twice, the control unit 115 may command the lock actuator 165 to unlock all of the doors of the vehicle. As described above, the light actuator 170 and the audible device 120 may be configured to provide visual and/or audible confirmation that the vehicle has been unlocked.

The panic button 315 may be configured to activate the security system and signal the audible device 120 to produce a sound at its highest programmed level in order to draw attention to the vehicle. The panic button 315 may further cause the audible device 120 to beep repeatedly for a predetermined amount of time or, e.g., until the panic button 315 is pressed again.

Figure 4:
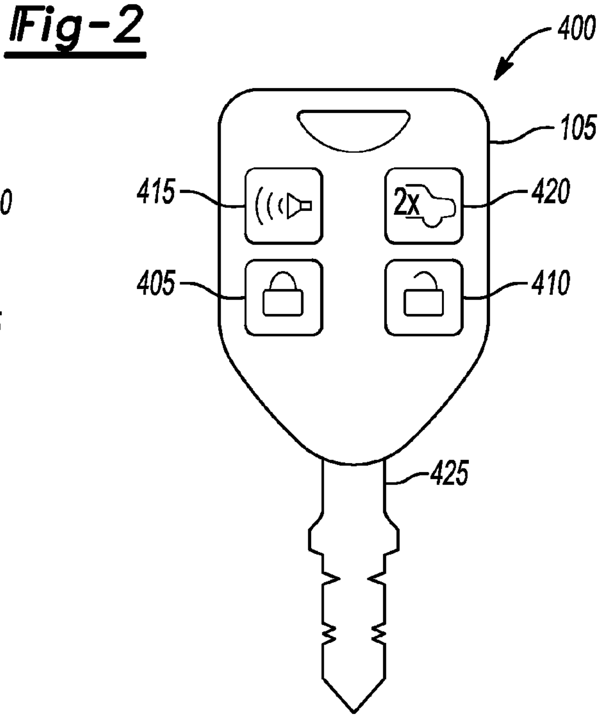
FIG. 4 illustrates a front view of another exemplary portable electronic device.

FIG. 4 illustrates an alternative exemplary remote system 400. In FIG. 4, a remote system 400, including a portable electronic device 105 having a lock button 405, an unlock button 410, a panic button 415, a rear-hatch button 420 and a key portion 425 is shown. The remote system 400 may also include a key portion.

The lock button 405, unlock button 410, and panic button 415 as shown in system 400 function similarly to the lock button 305, unlock button 310, and panic button 315 described in FIG. 3. The lock button 405 may be configured to lock the vehicle when pressed by a user. Furthermore, the lock button 405 may be configured to lock the vehicle, signal the audible device 120 to generate a sound, and flash the light(s) of the vehicle. The unlock button 410 may be configured to unlock the vehicle when the button is pressed. The unlock button 310 may further be configured to unlock all of the vehicle doors, or only a specific door, such as the driver door. The panic button 415 may be configured to activate the security system and signal the audible device 120 to produce a sound at its highest programmed level in order to draw attention to the vehicle.

The rear-hatch button 420 may be configured to unlock or open the trunk, rear hatch, or rear window of the vehicle when pressed, e.g., once or twice. That is, if the user presses the rear-hatch button 420 once, the rear window may open. If, however, the user presses the rear-hatch button 420 twice, the trunk of the vehicle may open instead of, e.g., the rear window.

The key portion 425 may be configured to start the vehicle. For example, the key portion 425 may be cut in a pattern to correspond with the ignition system of the vehicle.

Figure 5:
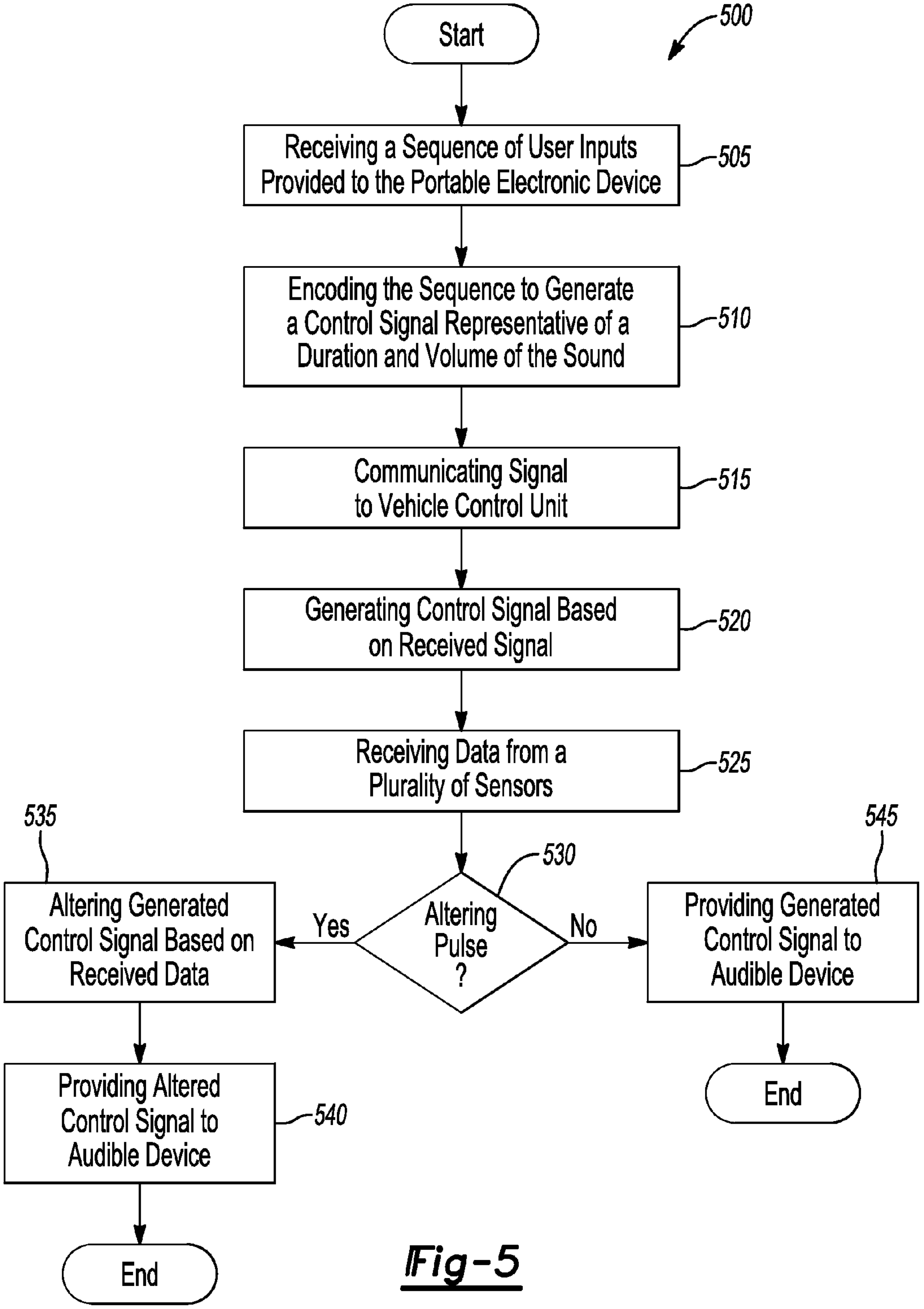
FIG. 5 illustrates a flowchart of an exemplary process for locating the vehicle.

FIG. 5 illustrates an exemplary process 500 of locating the vehicle. The process 500 may be performed by various devices of the system shown in FIGS. 1, 3, and 4, such as by the portable electronic device 105 communicating a signal including a command to be executed by the control unit 115.

At block 505, the controller 130 receives a sequence of inputs from the keypad 125 as entered by the user. For example, the user may press the lock button on the keypad 125 of the portable electronic device 105 three times, and each successive press of the lock button may be received within a predetermined amount of time since the prior press, such as within five seconds of each other.

At block 510, the controller 130 encodes the sequence of inputs received from the keypad 125 as a signal including a command to be executed by the control unit 115. For example, the controller 130 may receive a sequence from the keypad 125 that indicates the user pressed the lock button three times. The controller 130 may be configured to encode that sequence as a signal including a command for the control unit 115 to generate a control signal representative of a sound at a predefined volume and duration. The control signal may be transmitted to the audible device 120 which in turn will produce a sound at the predefined volume correlating to the number of times the lock button was pressed by the user. The signal may also include an instruction for the control unit 115 to transmit a command to a lock actuator 165 and/or a light actuator 170.

At block 515, the controller 130 communicates the signal to the control unit 115 via the transceiver 135 transmitting the signal to the control transceiver 110. For example, the controller 130 may communicate the generated element of data to the transceiver 135, and the transceiver 135 may transmit the signal across an ultra-high radio frequency to the control transceiver 110. The control transceiver 110 may be configured to communicate the signal received from the portable electronic device 105 to the control unit 115 across a network, such as a controller area network (CAN).

At block 520, the control unit 115 generates a control signal based on the signal received from the portable electronic device 105. For example, the control unit 115 may be configured to generate a control signal that represents a sound to be produced by the audible device 120 at a predefined volume and duration based on the signal received from the portable electronic device 105. As another example, the control unit 115 may be configured to generate a command based on the signal for an actuator, such as a lock actuator 165 or a light actuator 170, to lock or unlock the doors of the vehicle or flash the lights of the vehicle.

At block 525, the control unit 115 receives data from the sensor(s) 150. For example, the control unit 115 may receive visual data from a camera sensor 150 attached to the vehicle. The control unit 115 may be configured to analyze the visual data received from the camera sensor 150 and determine whether the surrounding environment includes a sound absorbing medium, such as a shrub, or a sound reflecting or magnifying medium, such as a brick wall. The control unit 115 may also receive temperature data from a heat sensor 150. The heat sensor 150 may be configured to record the ambient temperature or the temperature of the electronic device.

At decision point 530, the control unit 115 determines whether there are any environmental conditions present that would require the volume and duration of the sound, as requested by the portable electronic device 105, to be altered prior to being transmitted to the audible device 120. The control unit 115 may be configured to analyze visual data received from a camera sensor(s) 150 attached vehicle to determine whether a sound absorbing medium or a sound reflecting or magnifying medium is located near the vehicle. For example, based on the visual data provided by the camera sensor 150, the control unit 115 may be configured to determine whether there is a sound absorbing medium or a sound reflecting or magnifying medium in the area. A sound absorbing medium, such as a tree or shrub, may dampen the sound produced by the audible device 120. Alternatively, a sound magnifying or reflecting medium, such as a rock or ceiling in a parking garage, may magnify the sound produced by the audible device 120. Furthermore, the control unit 115 may be configured to analyze temperature data provided by a heat sensor 150 to determine whether the environmental conditions may improve or inhibit the travel of sound waves. For example, based on the temperature data provided by the heat sensor 150, the control unit 115 may be configured to determine whether the ambient conditions will affect the travel of the sound waves produced by the audible device 120. As an example, if the ambient temperature is above a predefined temperature, such as 60 degrees Fahrenheit, the sound waves produced by the audible device 120 may travel faster and as a result be capable of being heard from a greater distance away. Alternatively, if the ambient temperature is below a predefined temperature, such as 30 degrees Fahrenheit, the sound waves produced by the audible device 120 may travel slower and as a result have a reduced range. The process 500 may continue with block 535 if the control unit 115 determines that the temperature conditions fall outside a predefined range, such as above 60 degrees Fahrenheit or below 30 degrees Fahrenheit, or if a sound absorbing or sound magnifying medium is detected near the vehicle. Otherwise, the process 500 may continue to block 545.

At block 535, the control unit 115 alters the control signal to be transmitted to the audible device 120 based on the set of data received from the sensor(s) 150. For example, if the control unit 115 determines that based on the visual data from a sensor 150 that a sound absorbing medium is located near the vehicle, the control unit 115 may increase the magnitude and duration of the control signal transmitted to the audible device 120 in order to compensate for the dampening effect of the sound absorbing medium. Alternatively, if the control unit 115 determines that a sound reflecting or sound magnifying medium is located near the vehicle, the control unit 115 may decrease the magnitude and duration of the control signal transmitted to the audible device 120. As another example, based on the temperature data provided by a heat sensor 150, the control unit 115 may be configured to alter the magnitude and duration of control signal transmitted to the audible device 120 in relation to the signal received from the portable electronic device 105. If the control unit 115 determines that the ambient temperature is above predefined temperature, such as 60 degrees Fahrenheit, the control unit 115 may decrease the volume and duration of the control signal transmitted to the audible device 120 in order to compensate for warm environment allowing sound waves to travel faster. Alternatively, if the control unit 115 determines that the ambient temperature is below a predefined temperature, such as 30 degrees Fahrenheit, the control unit 115 may increase the magnitude and duration of the control signal transmitted to the audible device 120. Similarly, the control unit 115 may be configured to alter the magnitude and duration of the control signal transmitted to the audible device 120 based on the temperature of the audible device 120, such as a horn.

At block 540, the control unit 115 provides the altered control signal to the audible device 120, indicative of the magnitude and duration of the sound to be produced by the audible device 120. For example, the control unit 115 may be configured to transmit a control signal to the audible device 120, causing the audible device to produce a sound at a predefined volume and duration based on the signal received from the portable electronic device 105 as altered by the control unit 115 based on the data received from the sensor(s) 150. The process 500 may end after block 540.

At block 545, the control unit 115 provides the generated control signal to the audible device 120, indicative of a volume and duration of the sound to be produced by the audible device. For example, the control unit 115 may be configured to transmit a control signal to the audible device 120, causing the audible device to produce a sound at a predefined volume and duration based on the signal received from the portable electronic device 105.

The process may end after block 545.

In sum, the vehicle locator system 100 may be configured to locate a user's vehicle through the use of an audible signal being produced by an audible device 120 attached to the vehicle. The volume and duration of the sound produced by the audible device 120 is determined based on a user's input to a portable electronic device 105 carried by the user. Thus, depending on how many times a user presses a button on the keypad 125 of the portable electronic device 105 will be representative of how loud the sound produced by the audible device 120 at the vehicle should be. Further, the control unit 115 may alter the volume and duration of the sound requested by the portable electronic device 105 based on features of the surrounding environment, such as ambient temperature or sound alter mediums.

While the vehicle locator system 100 is described in terms of a system for locating a vehicle, other examples are possible. For instance, the features of the control unit 115 described in the vehicle locator system 100 may be implemented by other types of portable or mobile devices capable of being lost or misplaced by the user, such as an MP3 player, a portable satellite computer, laptop, smartphone or other type of media player. For example, a laptop may include a control unit 115 and audible device 120 as described and be configured to communicate with a user's portable electronic device 105, such as a smart phone, capable of communicating a signal to the control unit 115 requesting the audible device 120 to produce a sound when the user is trying to locate their laptop.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:

a receiver configured to receive a signal representing a sequence of user inputs to a portable electronic device; and an audible device configured to generate a sound based at least in part on the sequence of user inputs, wherein a duration and volume of the sound is based at least in part on the sequence of user inputs received within a predetermined time interval.

2. The system of claim 1, wherein the portable electronic device is configured to transmit the signal representing the sequence of user inputs and store the sequence for a predetermined amount of time.

3. The system of claim 1, further comprising:

a control unit configured to receive the signal and generate a control signal in accordance with the sequence of user inputs, wherein the audible device is configured to generate the sound based on the control signal.

4. The system of claim 3, wherein the control unit is configured to recreate the control signal in response to receiving a single user input provided to the portable electronic device within the predetermined amount of time.

5. The system of claim 3, wherein the duration and volume of the audible sound is based at least in part on a voltage of the control signal output to the audible device.

6. The system in claim 1, further comprising a sensor in communication with the control unit, and wherein the control unit is configured to generate the control signal according to data received from the sensor.

7. The system of claim 1, wherein the control unit is configured to control the audible sound based on at least in part on a received signal strength of the signal received from the portable electronic device.

8. The system of claim 1, wherein the control unit is configured to increase the duration and volume of the audible sound independent of a duration and volume indicated by the signal transmitted from the portable electronic device.

9. The system of claim 1, wherein the control unit is configured to control the audible sound based at least in part on a location of the receiver relative to a location of the portable electronic device.

10. The system of claim 1, further comprising a sensor configured to determine a location of the portable electronic device relative to the control unit, wherein the control unit is configured to control the sound according to the location of the portable electronic device relative to the control unit.

11. A method comprising:

receiving a signal representing a sequence of user inputs provided to a portable electronic device within a predetermined time interval; and generating a sound based at least in part on the sequence of user inputs, wherein a duration and volume of the sound is based at least in part on the sequence of user inputs received.

12. The method of claim 11, further comprising generating a control signal in accordance with the sequence of user inputs to control the sound.

13. The method of claim 11, wherein the control unit is configured to recreate the control signal in response to receiving a single user input provided to the portable electronic device within the predetermined amount of time.

14. The method of claim 11, wherein the duration and volume of the sound is based at least in part on a voltage of the control signal output to the audible device.

15. The method in claim 11, the control signal is generated according to data received from the sensor.

16. The method of claim 11, wherein the control signal is generated based on at least in part on a received signal strength of the signal received from the portable electronic device.

17. The method of claim 11, wherein the control signal is generated to increase the duration and volume of the sound independent of a duration and volume indicated by the signal transmitted from the portable electronic device.

18. The method of claim 11, wherein the control signal is generated to control the sound based at least in part on a location of the receiver relative to a location of the portable electronic device.

19. The method of claim 11, wherein the control signal is generated to control the sound according to the location of the portable electronic device relative to the control unit.

20. A vehicle comprising:

a receiver configured to receive a signal representing a sequence of user inputs provided to a portable electronic device;

an audible device configured to generate a sound based at least in part on the sequence of user inputs, wherein a duration and volume of the sound is based at least in part on the sequence of user inputs received within a predetermined time interval; and a control unit configured to receive the signal and generate a control signal in accordance with the sequence of user inputs provided to the portable electronic device, wherein the audible device is configured to generate the sound based on the control signal.

* * * * *